US009615382B2

United States Patent
Ljung

(10) Patent No.: US 9,615,382 B2
(45) Date of Patent: *Apr. 4, 2017

(54) NON-REAL-TIME TRAFFIC AGGREGATION IN RELAY NODES FOR INCREASED NETWORK CAPACITY

(71) Applicant: Sony Mobile Communications AB, Lund (SE)

(72) Inventor: Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/011,973

(22) Filed: Feb. 1, 2016

(65) Prior Publication Data

US 2016/0150563 A1  May 26, 2016

Related U.S. Application Data

(63) Continuation of application No. 13/565,006, filed on Aug. 2, 2012, now Pat. No. 9,252,866.

(51) Int. Cl.
*H04W 74/00* (2009.01)
*H04B 7/155* (2006.01)
*H04B 7/26* (2006.01)

(52) U.S. Cl.
CPC .......... *H04W 74/004* (2013.01); *H04B 7/155* (2013.01); *H04B 7/15521* (2013.01);
(Continued)

(58) Field of Classification Search
CPC .......... H04B 7/155521; H04B 7/15557; H04B 7/2606; H04W 74/004; H04W 74/006
See application file for complete search history.

(56) References Cited

U.S. PATENT DOCUMENTS 6,865,163 B1   3/2005  Bergenwall et al.
7,876,791 B2 *  1/2011  Jung ..................... H04J 3/0667
                                        370/345
(Continued)

FOREIGN PATENT DOCUMENTS

EP   1 729 435    6/2006
EP   1 912 452    4/2008
(Continued)

OTHER PUBLICATIONS

Hart et al. ("Wireless Communication Systems" European Patent Application 1912452 A2 published Apr. 16, 2008; hereinafter Hart).

(Continued)

*Primary Examiner* — Andrew Lai
*Assistant Examiner* — Hoyet H Andrews, III
(74) *Attorney, Agent, or Firm* — Renner, Otto, Boisselle & Sklar, LLP

(57) ABSTRACT

A relay node for aggregating data transfers in a wireless telecommunications network includes a receiver configured to receive uplink signals from multiple terminals, each uplink signal including respective uplink data, a decoder operatively connected to the receiver and configured to decode the uplink signals to obtain the uplink data, a machine-readable storage medium operatively connected to the decoder and configured to store the uplink data, an encoder operatively connected to the machine-readable medium and configured to encode an aggregate uplink signal including the uplink data obtained from the uplink signals, and a transmitter configured to transmit an uplink transmission of the aggregate uplink signal to the base station.

10 Claims, 7 Drawing Sheets

(52) U.S. Cl.
CPC ...... *H04B 7/15557* (2013.01); *H04W 74/006* (2013.01); *H04B 7/2606* (2013.01)

(56) References Cited

U.S. PATENT DOCUMENTS

| | | | |
|---|---|---|---|
| 8,571,068 B2* | 10/2013 | Fourcand | H04J 3/0667 370/498 |
| 2004/0005882 A1 | 1/2004 | Yoshii | |
| 2006/0285484 A1 | 12/2006 | Papasakellariou et al. | |
| 2008/0207214 A1 | 8/2008 | Han et al. | |
| 2008/0280638 A1 | 11/2008 | Malladi et al. | |
| 2009/0323664 A1 | 12/2009 | Li et al. | |
| 2011/0264740 A1 | 10/2011 | Diachina et al. | |
| 2012/0020417 A1* | 1/2012 | Wei | H04J 3/0638 375/259 |
| 2012/0044828 A1 | 2/2012 | Seo et al. | |
| 2012/0071085 A1 | 3/2012 | Gunnarsson et al. | |
| 2013/0034110 A1* | 2/2013 | Vijayasankar | H04B 3/54 370/436 |
| 2013/0083723 A1 | 4/2013 | Morioka | |
| 2014/0079409 A1* | 3/2014 | Ruffini | H04J 3/065 398/154 |

FOREIGN PATENT DOCUMENTS

| | | | |
|---|---|---|---|
| EP | 1912452 A2 * | 4/2008 | ............ H04B 7/155 |
| JP | 2012-004987 | 1/2012 | |
| KR | 10-2011-0033701 | 3/2011 | |
| KR | 10-2012-0070689 | 7/2012 | |

OTHER PUBLICATIONS

J. Salo et al., "Practical Introduction to LTE Radio Planning," pp. 1-20.

International Search Report/Written Opinion of PCT/IB2013/001695; filed Aug. 1, 2013.

* cited by examiner

NON-REAL-TIME TRAFFIC AGGREGATION IN RELAY NODES FOR INCREASED NETWORK CAPACITY

TECHNICAL FIELD OF THE INVENTION

The technology of the present disclosure relates generally to portable electronic devices and transmission equipment operable in a wireless communication network, and more particularly to systems and methods for relay node aggregation of data transfers in a wireless telecommunication network.

DESCRIPTION OF THE RELATED ART

Portable electronic devices that operate in a cellular network, such as mobile telephones and smartphones, tablet computers, cellular-connected laptop computers, and similar devices are ever increasing in popularity. In a typical wireless telecommunication network, terminals (also known as mobile stations and/or user equipment (UE)) communicate via a radio access network (RAN) to one or more core networks. The RAN covers a geographical area which is divided into cell areas, with each cell area being served by a base station, e.g., a radio base station (RBS), which in some networks may also be called, for example, NodeB in UMTS or eNodeB in LTE. A cell is a geographical area where radio coverage is provided by the radio base station equipment at a base station site. Each cell is identified by an identity within the local radio area, which is broadcast in the cell. The base stations communicate over the air interface operating on radio frequencies with the terminals within range of the base stations.

In some RAN versions, several base stations are connected (e.g., by landlines or microwave) to a controller node (such as a radio network controller (RNC) or a base station controller (BSC)) which supervises and coordinates various activities of the base stations connected thereto. The controller nodes are typically connected to one or more core networks.

In one example, the Universal Mobile Telecommunications System (UMTS) is a wireless telecommunication system that evolved from the Global System for Mobile Communications (GSM). In UMTS the RAN is referred to as a Universal Terrestrial Radio Access Network (UTRAN). UTRAN is a RAN that uses, among other radio access technologies (RAT), wideband code division multiple access (WCDMA) for communication between the mobile station and the terminal. Base stations in UMTS are known as NodeB, which connect to a radio network controller (RCN) which supervises and coordinates various activities of the NodeB connected thereto.

In another example, Long Term Evolution (LTE) is a wireless telecommunication system that evolved from UMTS and utilizes a RAN known as evolved Universal Terrestrial Radio Access Network (E-UTRAN). E-UTRAN is a RAN that uses a RAT also known as LTE for communication between the mobile station and the terminal. In LTE, the base stations, known as eNodeB, are connected directly to the core network rather than to an RNC. In general, in LTE the functions of the RNC are distributed between the eNodeB in the network.

Changes in a wireless environment affect the quality of signals transmitted and received in the network. Reception power rapidly decreases in proportion to increasing distance between base stations and terminals. As a result, a wireless communication system may employ a relay node (RN) (standardized for LTE in 3GPP release 10) to expand coverage and/or improve throughput, quality, etc. The basic functionality of the relay node is to wirelessly forward signals to/from a base station from/to a terminal. A relay node may perform the same or similar functions as a base station except that a relay node typically does not connect to the core network with a cable or microwave link and instead uses a nearby base station, also known as the donor base station, to connect to the core network. In 3GPP different types of relays have been defined, divided into two main categories. Type 1 relays are nontransparent and act as complete individual base stations from the terminal's perspective, while Type 2 relays are transparent and without individual base station control signals and identity.

In a wireless telecommunication system the total traffic load for a certain base station mostly depends on two parameters: 1) the total number of connection attempts per time unit, and 2) the total number of bytes requested to transfer per time unit. When a very large number of devices are connected to a network, as will be the case in a network with a large amount of machine type communication (MTC) devices, which are expected to reach several billions of terminals worldwide, control signaling to and from each and every terminal will consume a significant amount of network resources and put substantial strain on network capacity.

Moreover, wireless telecommunication systems are typically coverage limited in the so-called uplink direction (i.e., when the terminal is transmitting and the base station is receiving) because of the typical large difference in maximum output power between a terminal and base station. Systems are also capacity limited, mainly in downlink direction (i.e., when the base station is transmitting and the terminal is receiving), because of all capacity available (e.g., in terms of bandwidth, transmission time, output power etc.) in downlink transmissions is shared among all active terminals.

Based on this background, benefits for the network operator both in terms of network coverage and capacity may be obtained if the effects of power limitation could be reduced.

SUMMARY

The concept of the systems and methods disclosed herein include the capability for a relay node to wirelessly, without its own backhaul core network connection, act as a coverage extension to the wireless telecommunication system. The concept allows the relay node to aggregate and buffer services utilized by one or more terminals. The services might be real time or non-real-time. The relay node could therefore work as a service aggregator, adding together a number of different data access requests from one or more terminals coming into the relay node at approximately the same time. By aggregating the data requests instead of forwarding each and every data access request individually, the relay node acts in the macro network, in effect, as a single terminal, which contributes to significantly reduced control signaling at the base station. Under this concept, when the base station receives a request and responds to the request, the base station acts as if the request came from a single terminal, the relay node. This represents significant savings in overhead in the transmission between the terminals and the base station. A wireless telecommunication system incorporating the systems and methods disclosed herein would have a significantly reduced signaling load in the network.

The systems and methods can be implemented not only for so-called machine-type communications as defined by 3GPP, but also for any type of non-real-time communication. Moreover, in some cases, the systems and methods can be implemented for real-time communications. In addition, systems and methods disclosed herein can handle a mix of real time and non-real-time traffic.

Accordingly, in one aspect of the invention a terminal in a system for aggregating data transfers in a wireless telecommunications network includes a transmitter configured to transmit an uplink signal including uplink data, and an indication regarding whether the uplink signal corresponds to a real-time transmission. The terminal further includes a receiver configured to receive a downlink signal corresponding to the uplink signal.

In one embodiment, the indication is configured for a relay node to determine based on the indication whether the uplink data is to be included in an aggregate uplink signal to be transmitted to a base station, the aggregate uplink signal including the uplink data and additional uplink data obtained from additional uplink signals transmitted by devices other than the terminal.

In another embodiment, the indication is further configured for the relay node to determine based on the indication whether the uplink signal is to be transmitted to the base station.

In yet another embodiment, the indication indicates whether the terminal is a machine-type communication device.

In one embodiment, the uplink signal includes the indication.

In another embodiment, the indication is included in an indication signal separate from the uplink signal and transmitted by the terminal via a physical channel selected from the group consisting of Physical Random Access Channel (PRACH), Physical Uplink Shared Channel (PUSCH), and Physical Uplink Control Channel (PUCCH).

In yet another embodiment, the downlink signal includes downlink data obtained from an aggregated downlink signal received by the relay node from the base station.

In another aspect of the invention, a relay node for aggregating data transfers in a wireless telecommunications network includes a receiver configured to receive uplink signals from multiple terminals, each uplink signal including respective uplink data, a decoder operatively connected to the receiver and configured to decode the uplink signals to obtain the uplink data, a machine-readable storage medium operatively connected to the decoder and configured to store the uplink data, an encoder operatively connected to the machine-readable medium and configured to encode an aggregate uplink signal including the uplink data obtained from the uplink signals, and a transmitter configured to transmit an uplink transmission of the aggregate uplink signal to the base station.

In one embodiment, the receiver or a second receiver in the relay node is configured to receive from the multiple terminals indications regarding whether respective uplink signals correspond to real-time transmissions.

In another embodiment, the indications indicate whether a terminal to which a respective indication corresponds is a machine-type communication device.

In yet another embodiment, the relay node includes an aggregation logic configured to, based on the indications regarding whether the respective uplink signals correspond to real-time transmissions, determine whether the respective uplink data is to be included in the aggregate uplink signal to be transmitted to the base station, or whether the respective uplink signals are to be transmitted to the base station.

In one embodiment, where an indication indicates that a respective uplink signal is a real-time transmission, the aggregation logic is configured to instruct the transmitter to transmit the respective uplink signal to the base station.

In another embodiment, where the indication indicates that a respective uplink signal is not a real-time transmission, the aggregation logic is configured to instruct the encoder to encode the aggregate uplink signal including the uplink data obtained from the respective uplink signal.

In yet another embodiment, the receiver or another receiver in the relay node is configured to an aggregate downlink signal from the base station, the aggregate downlink signal including downlink data corresponding to respective ones of the uplink signals, the decoder or another decoder in the relay node is configured to decode the aggregate downlink signal to obtain the downlink data, the machine-readable storage medium or another machine-readable storage medium in the relay node is configured to store the downlink data, the encoder or another encoder in the relay node is configured to encode multiple downlink signals, the multiple downlink signals each including respective downlink data corresponding to portions of the downlink data decoded from the aggregate downlink signal and corresponding to respective ones of the uplink signals; and the transmitter or another transmitter in the relay node is configured to transmit the multiple downlink signals to the multiple terminals.

In yet another aspect of the invention, a method for the aggregation of data transfers in a wireless telecommunications network includes receiving uplink transmissions of uplink signals from multiple terminals, each uplink signal including respective uplink data, decoding the uplink signals to obtain respective uplink data and storing the uplink data, encoding an aggregate uplink signal including the uplink data obtained from the uplink signals, and transmitting the aggregate uplink signal to the base station.

In one embodiment, the method includes receiving from the multiple terminals indications regarding whether respective uplink signals correspond to real-time transmissions, and, based on the indications regarding whether the respective uplink signals correspond to real-time transmissions, determine whether the respective uplink data is to be included in the aggregate uplink signal to be transmitted to the base station, or whether the respective uplink signals are to be transmitted to the base station.

In another embodiment, the indications indicates whether a respective terminal is a machine-type communication device.

In yet another embodiment, where the indication indicates that the respective uplink signal is a real-time transmission, the method includes transmitting the respective uplink signal to the base station without including uplink data corresponding to the respective uplink signal in the aggregate uplink signal.

In one embodiment, where an indication indicates that the respective uplink signal is not a real-time transmission, the transmitting the aggregate uplink signal to the base station includes transmitting the aggregate uplink signal including data corresponding to the respective uplink signal in the aggregate uplink signal.

In another embodiment, the method includes receiving an aggregate downlink signal from the base station, the aggregate downlink signal including downlink data including data corresponding to respective ones of the uplink signals, decoding the aggregate downlink signal to obtain the downlink data and storing the downlink data, encoding multiple downlink signals, the multiple downlink signals each including respective downlink data corresponding to portions of the downlink data decoded from the aggregate downlink signal and corresponding to respective ones of the uplink signals, and transmitting the multiple downlink signals to the multiple terminals.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
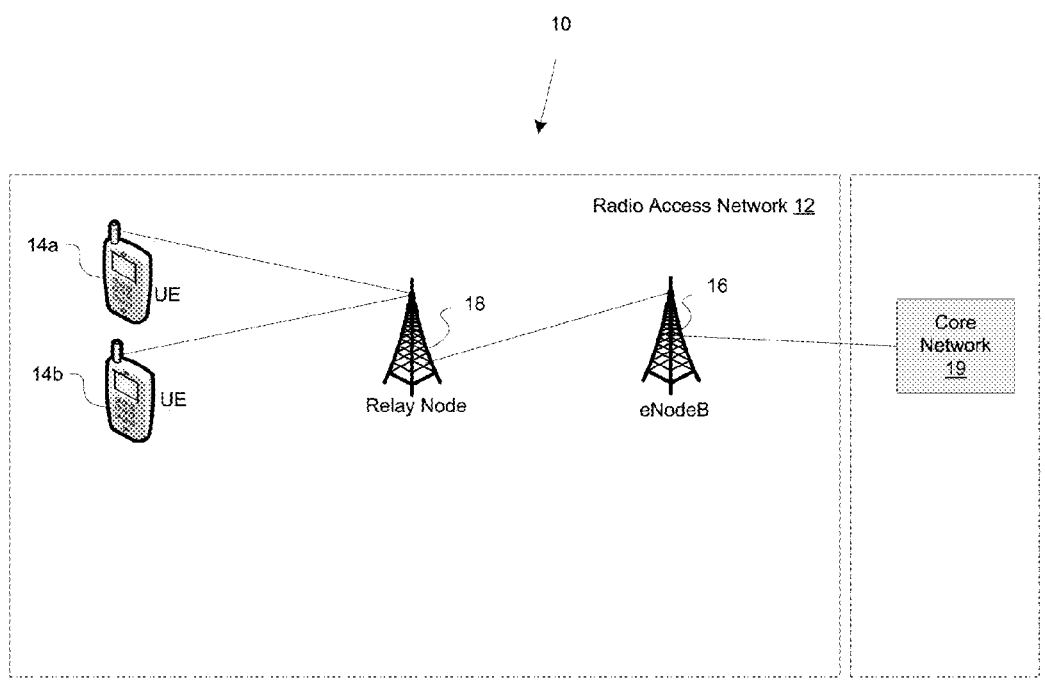
FIG. 1 illustrates a portion of a radio access network (RAN).

As described in more detail below, the present disclosure provides systems and methods that provide relay nodes with the capability of acting as an extension of base stations in the wireless telecommunication system.

Embodiments of the present invention will now be described with reference to the drawings, wherein like reference numerals are used to refer to like elements throughout. It will be understood that the figures are not necessarily to scale.

FIG. 1 illustrates a portion of a wireless telecommunications network 10. The network 10 includes a radio access network (RAN) 12. FIG. 1 illustrates the RAN 12 as an Evolved Universal Terrestrial Radio Access Network (EUTRAN), the RAN associated with LTE, as an example. However, the RAN 12 may also be any RAN other than EUTRAN including RAN that are currently deployed as well as RAN that are currently in development or that will be developed in the future. The network 10 includes a core network 19, which includes the parts of the telecommunications network 10 that provide the various services to customers who are connected by the RAN 12.

The RAN 12 includes terminals 14*a-b*. The terminals 14*a-b* are what in LTE is referred to as user equipment (UE). In wireless telecommunications networks other than LTE, including networks that are currently deployed as well as networks that are currently in development or that will be developed in the future, the terminals may be referred to by terms other than terminals, mobile stations, or user equipment. However, the term terminals as employed herein is intended to include those terminals in wireless telecommunications networks such as UMTS and LTE as well as networks other than UMTS and LTE, and terminals in yet to be developed or deployed networks where the terminals have similar functionality as the terminals described herein in the context of LTE.

The RAN 12 further includes a base station 16. As discussed above, in LTE the base station 16 is known as eNodeB (evolved NodeB or eNB). In wireless telecommunications networks other than LTE, including networks that are currently deployed as well as networks that are currently in development or that will be developed in the future, the base stations may be referred to by terms other than base stations, NodeB, or eNodeB. However, the term base station as employed herein is intended to include those base stations in wireless telecommunications networks such as UMTS and LTE as well as networks other than UMTS and LTE, and base stations in yet to be developed or deployed networks where the base stations have similar functionality as the base stations described herein in the context of LTE.

The RAN 12 also includes relay node 18. The base station 16 communicates with the relay node 18, and the relay node 18, in turn, communicates with the terminals 14*a-b* using radio access technologies (RAT) via an air interface. In LTE the RAT is known as LTE and the air interface is known as LTE-Uu. In the illustrated embodiment, the terminals 14*a-b* are currently connected to the relay node 18. A relay node as disclosed herein includes various entities defined in the 3GPP specification including relays, repeaters, base stations and access points along with femto or home base stations and other yet-to-be-defined entities that are not directly coupled to the core network 19, but instead communicate with the core network 19 via at least one other base station, such as the relay node 18 which is connected to the core network 19 via the base station 16. In one embodiment, the relay node 18 node has its own network ID, its own pilot signals, and so on.

Although RAN 12 has been described as discreetly LTE, in practice, base stations may be multi radio units, capable of transmitting in several different RAT. Moreover, different cells in the same base station may often use more than one frequency band. Due to the reuse of infrastructure at the cellular sites, as well as backhaul capabilities, a single base station may be using more than one RAT and may be transmitting at more than one carrier frequency. In addition, although the terminals 14*a-b* are illustrated as each connected to a relay node 18 and each relay node 18 connected to the base station 16, in practice some terminals that perhaps are in closer proximity to the base station 16 may connect directly to the base station 16 and not connect to a relay node.

In the RAN 12 the terminals 14*a-b* transmit uplink signals including data. For example, the terminals 14*a-b* transmit request signals requesting data from the base station 16. In a RAN that does not include relay nodes the uplink signals transmitted by the terminals 14a-b would be received by base stations such as the base station 16. However, in RAN 12, the relay node 18 receives the uplink signals from the terminals 14a-b.

Each of the terminals 14a-b transmits at least one uplink signal and therefore the relay node 18 receives multiple uplink signals. If the multiple uplink signals received from the same or other terminals are received within a short period of time, the multiple uplink signals may be aggregated into a combined or aggregate uplink signal for transmission to the base station 16. Upon receiving the multiple uplink signals from the multiple terminals 14a-b, the relay node 18 decodes the uplink signals to obtain the uplink data included in the uplink signals. The relay node 18 then encodes an aggregate uplink signal including the uplink data that was included in the uplink signals from the terminals 14a-b. The relay node 18 transmits the aggregate uplink signal. The base station 16 receives the aggregate uplink signal from the relay node 18. By aggregating the uplink data from the terminals 14a-b instead of forwarding each of the uplink signals individually to the base station 16, the relay node 18 acts, from the point of view of the base station 16, as a single terminal, which contributes to significantly less control signaling at the base station 16.

Similarly, the relay node 18 receives from the base station 16 an aggregate downlink signal that includes downlink data including data corresponding to respective ones of the uplink signals, and decodes the aggregate uplink signal to obtain the downlink data. The relay node 18 encodes multiple downlink signals, each for transmission to a corresponding terminal 14a or 14b. The downlink signals each includes a portion of the downlink data that corresponds to a respective uplink signal transmitted by the corresponding terminal 14a or 14b. The relay node 18 transmits each of the downlink signals to the corresponding terminals 14a or 14b. Thus, when the base station 16 responds to the aggregate uplink signal, the base station 16 responds as if responding to a single terminal and therefore the corresponding signaling and connection establishment overhead will be significantly smaller than it would otherwise be if the base station 16 was to transmit individual responses to each individual terminal. Therefore, the use of the relay node 18 reduces the total signaling load in the RAN 12.

With this approach the total number of connected terminals can be increased without the same proportion of additional control signal traffic generated in the network, and thereby saving operator network capacity. Moreover, by utilizing the relay node functionality defined in 3GPP the built-in security functionalities such as authentication and authorization defined for relay nodes in 3GPP securing may be utilized to enhance security and impede not authorized third parties from gaining access to data decoded in the relay node.

Figure 2:
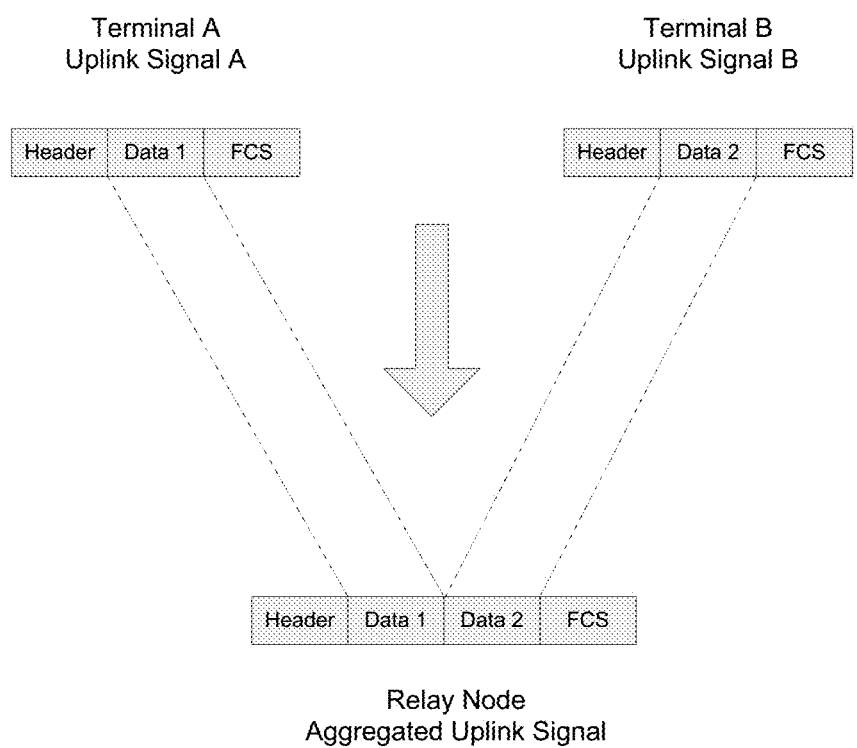
FIG. 2 illustrates a diagram illustrating the aggregation of uplink signals at a relay node.

FIG. 2 illustrates the aggregation of uplink signals at the relay node 18. A first terminal, Terminal A, transmits an uplink signal A and a second terminal, Terminal B, transmits a second uplink signal B. Each of the uplink signals A and B includes a header and a frame check sequence (FCS). If the uplink signals A and B were individually transmitted to the base station 16, the base station 16 would have to manage two uplink signals including the overhead associated with the two headers and two FCS. Instead, the relay node 18 aggregates the uplink data in each of the uplink signals A and B. The resulting aggregate uplink signal includes a single header and a single FCS. The base station 16, when receiving the aggregate uplink signal would have to manage a single uplink signal including reduced overhead associated with a single header and a single FCS.

Figure 3:
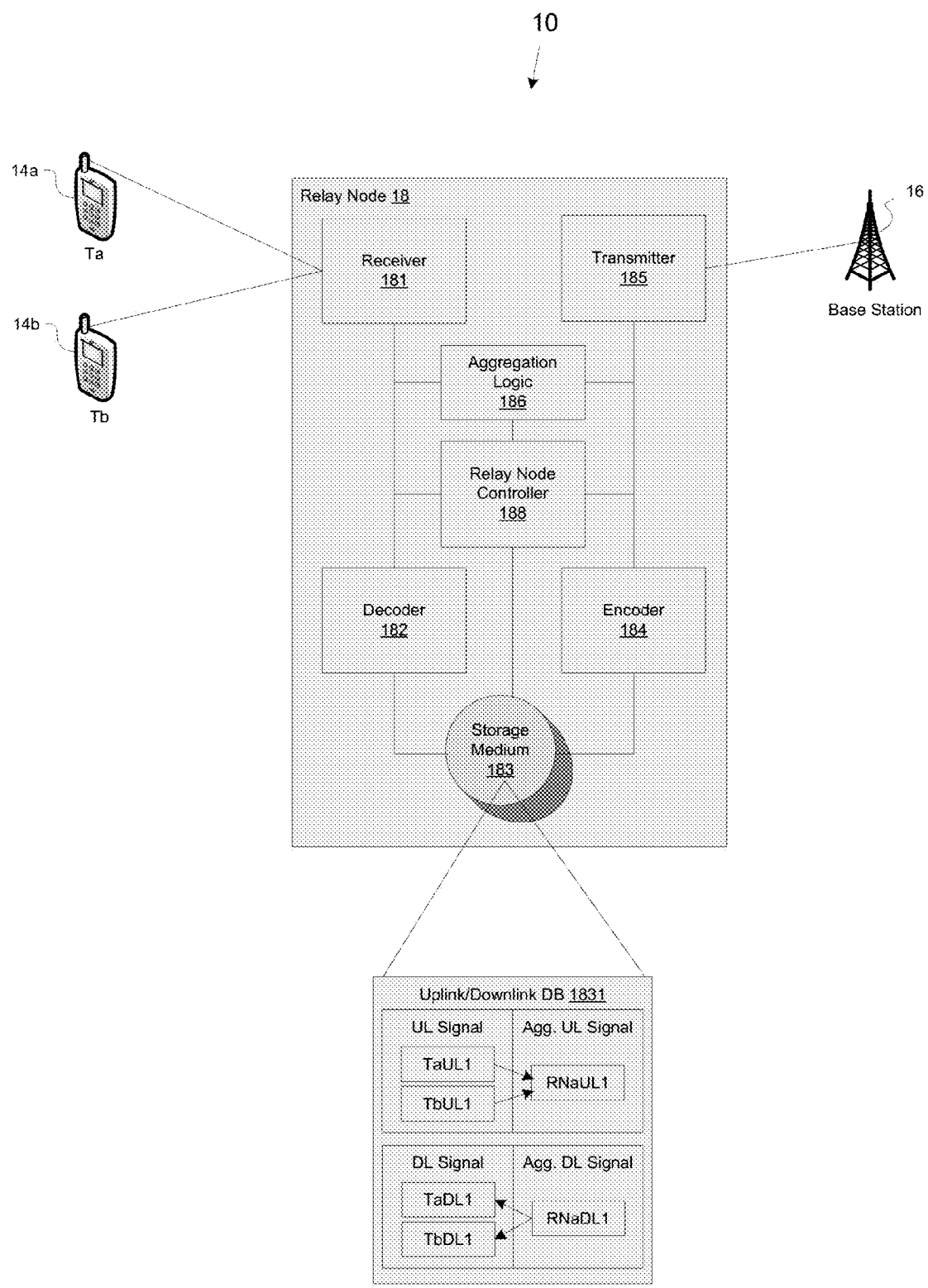
FIG. 3 illustrates a schematic diagram of the RAN 12 including an exemplary block diagram of a relay node for aggregating data transfers from terminals to base stations in a wireless telecommunications network.

FIG. 3 illustrates a schematic diagram of the RAN 12 including an exemplary block diagram of the relay node 18 for aggregating data transfers from terminals to base stations in a wireless telecommunications network.

The relay node 18 includes a receiver 181 that receives uplink transmissions from the terminals 14a-b. The receiver 181 is illustrated in FIG. 3 as a discrete receiver. However, the receiver 181 may be implemented discretely as shown or as part of a transceiver. The relay node 18 may also include multiple receivers. The uplink signals that the receiver 181 receives from the terminals 14a-b include uplink data. The relay node 18 includes a decoder 182 that decodes the uplink signals to obtain the uplink data and a machine-readable storage medium 183 where the decoded uplink data is stored. The relay node 18 further includes an encoder 184 that encodes an aggregate uplink signal that includes the uplink data obtained from the uplink signals from the individual terminals 14a-b. The relay node 18 also includes a transmitter 185 that transmits the aggregate uplink signal to the base station 16. The transmitter 185 is illustrated in FIG. 3 as a discrete transmitter. However, the transmitter 185 may be implemented discretely as shown or as part of a transceiver. The relay node 18 may also include multiple transmitters.

In one embodiment, in addition to the uplink signals, the receiver 181 (or another receiver in the relay node 18) receives from the terminals 14a-b indications regarding whether respective uplink signals correspond to real-time transmissions. For example, terminal 14a transmits an uplink signal corresponding to a telephone call. In addition, the terminal 14a transmits an indication indicating that the uplink signal corresponding to the telephone call is a real-time transmission. In another example, the terminal 14a transmits an uplink signal corresponding to an email. In addition, the terminal 14a transmits an indication indicating that the uplink signal corresponding to the email is not a real-time transmission. The telephone call is classified as a real-time transmission because delays in transmission of uplink signals associated with the telephone call may affect quality of service (QoS). In contrast, the email may be classified as a non-real-time transmission because, unlike the telephone call, some delay in the transmission of the uplink signals associated with the email will not tangibly affect QoS. Other examples of non-real-time transmission include background activity in the terminal 14a or 14b (e.g., firmware update, maintenance, etc.)

In one embodiment, the indication is an indication bit set in relation to the uplink signal. In one embodiment, a terminal, such as terminals 14a or 14b, transmits the indication regarding whether a respective uplink signal correspond to a real-time transmissions as part of the uplink signal. In another embodiment, the terminal transmits the indication as a discrete indication signal separate from the uplink signal. In one embodiment, the terminal transmits the indication signal using a channel between the terminal, 14a or 14b, and the relay node 18. For example, any one of the physical, transport or logical channels as specified in the 3GPP specification may be used. In another embodiment, the terminal transmits the indication signal using a channel between the terminal, 14a or 14b, and the relay node 18 that is a physical, transport or logical channel not currently specified in the 3GPP specification.

In one embodiment, the indication is an indication bit set in relation to the terminal. In one embodiment, the indication regarding whether a corresponding uplink signal corresponds to a real-time transmission takes the form of a signal that indicates whether the corresponding terminal, 14a or 14b (the terminal transmitting the corresponding uplink signal), is a machine-type communication (MTC) device. MTC is a type of data communication that includes one or more entities that do not require human interactions. Thus, in general, MTC refers to communications used by a machine device instead of a terminal used by a human user. The machine device used in the MTC is called an MTC device. Examples of MTC devices include vending machines, vehicle performance tracking devices such as Progressive Insurance's Snapshot, etc. The MTC device has features different from that of a typical terminal used by a human user. Therefore, a service optimized for the MTC device may differ from a service optimized for human-to-human communication. In particular, a service optimized for human-to-human communication, and in particular speech communication, may be characterized as real-time communication because the connection between the human users requires continues or apparently continuous communication to make the interaction between the human users utilizing the terminals satisfactory. As described above, delays in transmission of uplink signals associated with the telephone call may affect quality of service (QoS). In contrast, MTC is often characterized by short, sporadic communications that are non-real-time in nature.

In one embodiment, the relay node 18 includes an aggregation logic 186 that makes decisions regarding how to handle the uplink signal from the terminal 14a or 14b based on the corresponding indication regarding whether the respective uplink signal corresponds to a real-time transmission. For example, based on the indication, the aggregation logic 186 may determine that the uplink signal is to be decoded and that the respective uplink data is to be included in the aggregate uplink signal to be transmitted to the base station 16. On the other hand, based on the indication, the aggregation logic 186 may determine that the respective uplink signal is to be directly transmitted to the base station 16 without delay (e.g., without being decoded). Moreover, working in conjunction with the relay node controller 188, the aggregation logic controls the receiver 181, decoder 182, storage medium 183, encoder 184, and transmitter 185. Therefore, where the indication regarding whether the respective uplink signal corresponds to a real-time transmission indicates that a respective uplink signal is a real-time transmission the aggregation logic 186 in conjunction with the relay node controller 188 instructs the transmitter 185 to transmit the uplink signal to the base station. Similarly, where the indication indicates that a respective uplink signal is not a real-time transmission the aggregation logic 186 in conjunction with the relay node controller 188 instructs the decoder 182 to decode the uplink signal, the encoder 184 to encode the aggregate uplink signal including the uplink data obtained from the uplink signal, and the transmitter 185 to transmit the aggregate uplink signal that includes the uplink data obtained from the uplink signal.

In another embodiment, the relay node 18 does not receive an indication regarding whether the respective uplink signal corresponds to a real-time transmission and the aggregation logic 186 makes decisions regarding how to handle the uplink signal based on data other than any corresponding indication regarding whether the respective uplink signal corresponds to a real-time transmission. In yet another embodiment, the aggregation logic 186 makes no decisions regarding how to handle the uplink signals, but instead aggregates uplink data from every uplink signal received from the terminals 14a-b into aggregate uplink signals regardless of whether the respective uplink signal corresponds to a real-time transmission. For example, for voice services such as a telephone call there are fairly stringent maximum delay requirements. However, by aggregating a small number of uplink signals (e.g., every 2 voice frames), significant reduction (i.e., 50%) in signaling overhead can be obtained while minimally degrading voice quality.

In one embodiment, the relay node 18 receives the indication regarding whether the respective uplink signal corresponds to a real-time transmission and the aggregation logic 186 makes decisions regarding how to handle the uplink signal based on the indication. However, in this embodiment, the aggregation logic 186 utilizes the indication to determine how many frames of the uplink signals to aggregate in the aggregate uplink signal. For example, for non-real-time transmissions, relatively long aggregate uplink signals are possible since delay is not as much of a concern. However, for real-time transmission, relatively short aggregate uplink signals are preferred since delay is an important concern.

Similar to the uplink described above, in one embodiment (not shown), the receiver 181 (or another receiver in the relay node 18) receives an aggregate downlink signal that includes downlink data from the base station 16. The decoder 182 (or another decoder in the relay node 18) decodes the aggregate downlink signal to obtain the downlink data, which may be stored in the medium 183 or another machine-readable storage medium in the relay node 18. The encoder 184 (or another encoder in the relay node 18) encodes multiple downlink signals each including downlink data. The transmitter 185 (or another transmitter in the relay node 18) transmits the multiple downlink signals to the terminals 14a and 14b.

In one embodiment, the downlink data in the aggregate downlink signal received from the base station 16 includes data corresponding to respective ones of the uplink signals. For example, where the uplink signal from a terminal 14a or 14b is a request for data to the base station 16, the downlink data in the aggregate downlink signal includes a response to the request for data in the uplink signal. The aggregate downlink signal is decoded to obtain the downlink data, which is, in turn, encoded into the multiple downlink signals. Each of the downlink signals includes a portion of the aggregate downlink signal. The downlink signal includes a response to the request for data in the corresponding uplink signal. For the purpose of correlating uplink and downlink data in accordance with this embodiment, in one embodiment, the relay node 18 includes an uplink/downlink database 1831 stored in the medium 183.

The uplink/downlink database 1831 keeps track of uplink signals and their corresponding uplink data and correlates the uplink data with downlink data obtained from aggregate downlink signals. In the illustrated example, two uplink signals, one from a terminal Ta and another from a terminal Tb include uplink data TaUL1 and TbUL1, respectively. The uplink data is encoded into an aggregate uplink signal RNaUL1, which is transmitted to the base station 16. The relay node 18 receives an aggregate downlink signal RNaDL1, which includes downlink data corresponding to the uplink signals TaUL1 and TbUL1. The uplink/downlink database 1831 correlates corresponding portions of the downlink data to the uplink signals TaUL1 and TbUL1. In that way, the signals TaDL1 and TbDL1 are encoded including downlink data that corresponds to the uplink data TaUL1 and TbUL1, respectively. Downlink signals are encoded and, based on the database information, the corresponding one of the uplink signals is transmitted to the corresponding terminal Ta or Tb.

Although the receiving, decoding, encoding, and transmitting associated with the relay node 18 has been described herein as taking place in sequential order, in practice, these processes are not necessarily sequential and moreover the relay node 18 and particularly the medium 183 may act as a buffer to store data until it is time to combine or separate the data obtained from multiple transmission from the terminals 14*a-b* or from aggregated transmissions from the base station 16, respectively.

Figure 4:
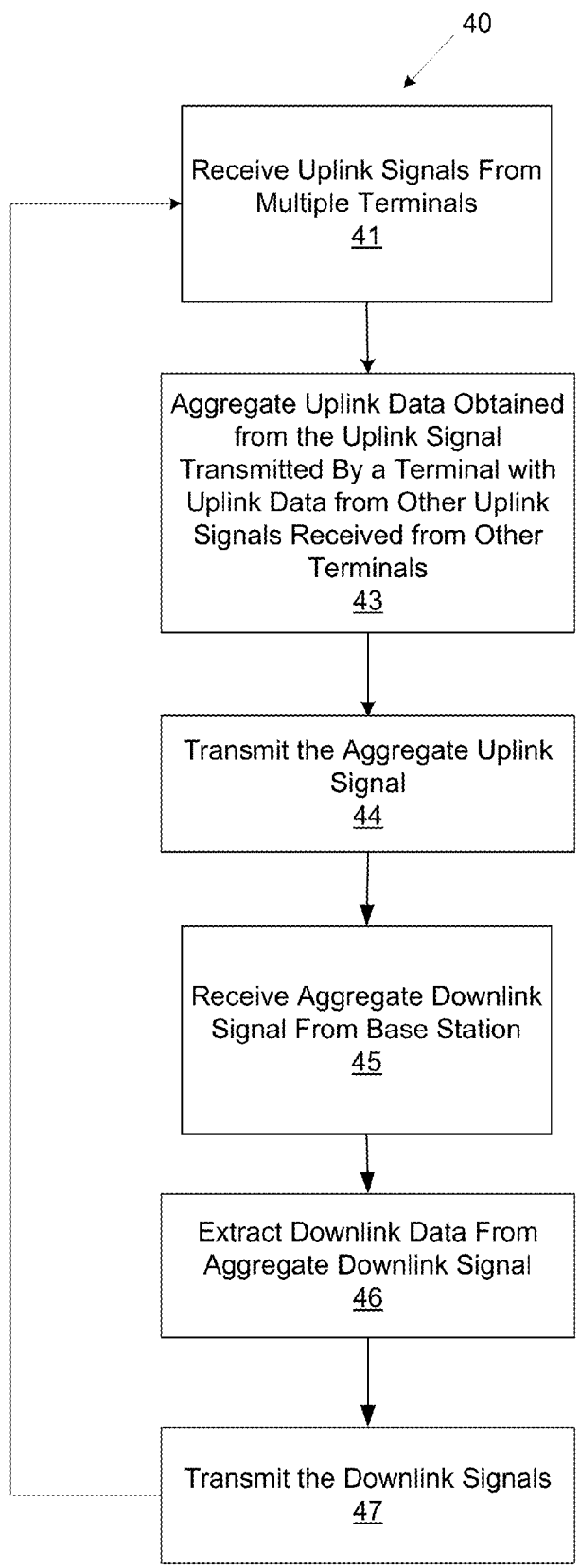
FIG. 4 illustrates a logical flow of a method for a relay node to aggregate data transfers in a wireless telecommunications network.
Figure 5:
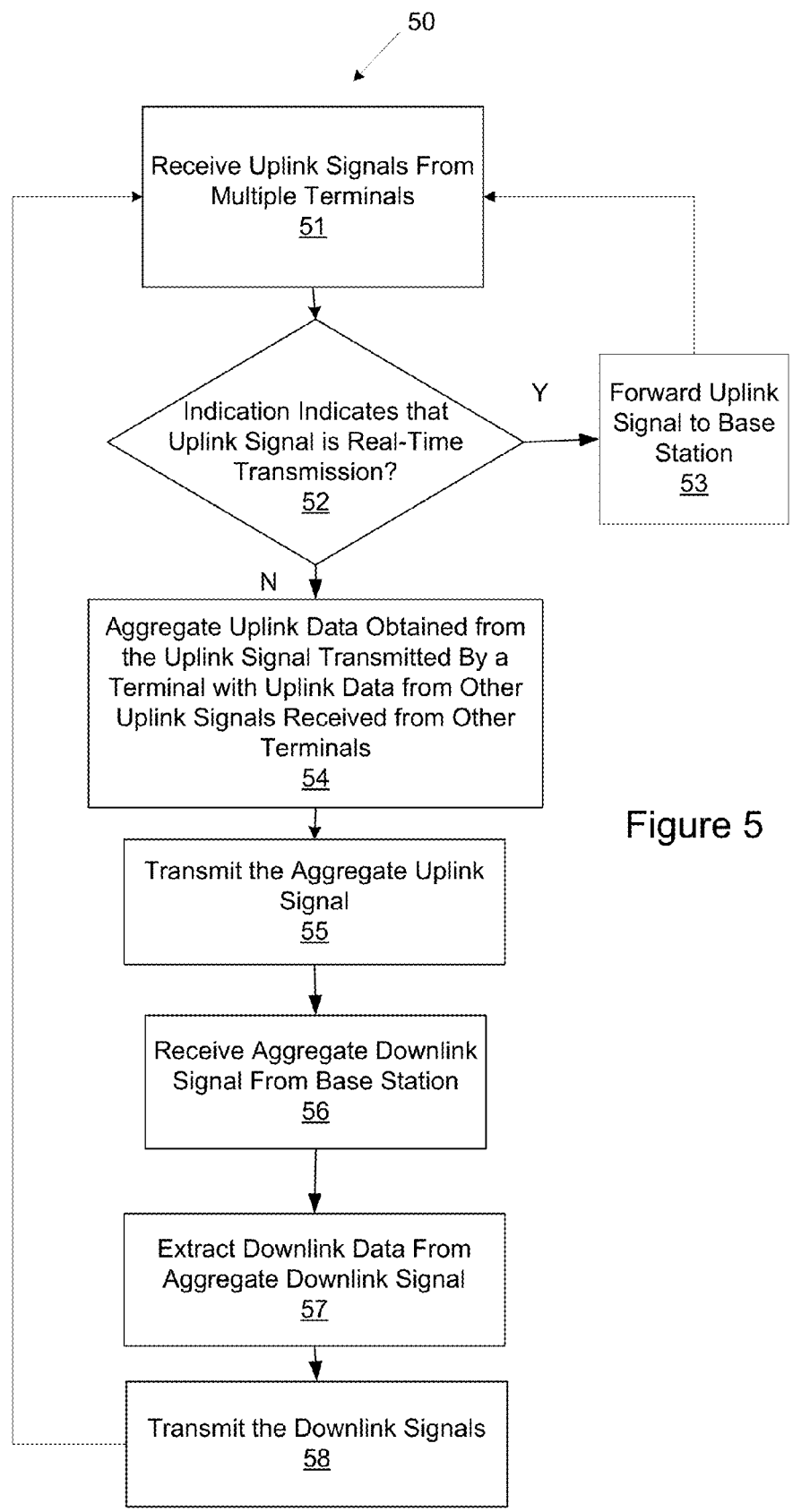
FIG. 5 illustrates a logical flow of a method for a relay node to aggregate data transfers in a wireless telecommunications network.
Figure 6:
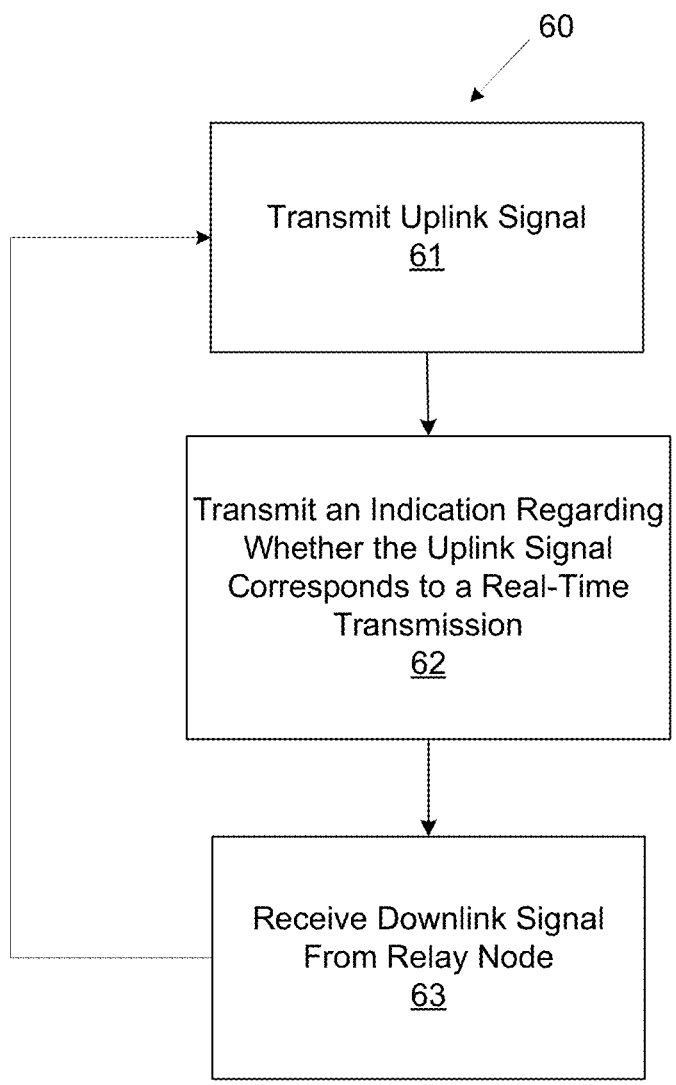
FIG. 6 illustrates a logical flow of a method for aggregation of data transfers in a wireless telecommunications network.

In accordance with the above features, FIGS. 4-6 show flowcharts that illustrate logical operations to implement exemplary methods for dynamic adaptation of one or more communication parameters for communication between a base station and a terminal in a wireless telecommunications network. The exemplary methods may be carried out by executing embodiments of the base stations, terminals, mobile telephones, flash devices or machine-readable storage media disclosed herein, for example. Thus, the flowcharts of FIGS. 4-6 may be thought of as depicting steps of a method carried out in the above-disclosed systems or devices by operation of hardware, software, or combinations thereof. Although FIGS. 4-6 show a specific order of executing functional logic blocks, the order of executing the blocks may be changed relative to the order shown. Also, two or more blocks shown in succession may be executed concurrently or with partial concurrence. Certain blocks also may be omitted.

In reference to FIG. 4, logical flow of a method 40 for a relay node to aggregate data transfers from terminals to a base station in a wireless telecommunications network includes, at 41, receiving uplink signals from multiple terminals. The uplink signals include uplink data. At 43, the method 40 further includes, aggregating uplink data corresponding to the uplink signal from one terminal with uplink data from other uplink signals received from other terminals. At 44, the method 40 includes transmitting the aggregate uplink signal. At 45, the method 40 includes receiving an aggregate downlink signal (i.e., a response signal) from the base station. At 45, the method 40 includes extracting downlink data from the aggregate downlink signal, and, at 47, transmitting downlink signals to the corresponding terminals incorporating respective downlink data corresponding to the uplink data that the terminal transmitted.

In reference to FIG. 5, logical flow of a method 50 for a relay node to aggregate data transfers from terminals to a base station in a wireless telecommunications network includes, at 51, receiving transmissions of uplink signals from multiple terminals. The uplink signals include uplink data. At 52, the method 50 further includes, based on indications received from the terminals determine whether the respective uplink signals correspond to real-time transmissions. If a respective uplink signal corresponds to a real-time transmission, at 53, forward the uplink signal to the base station as is in order to minimize the relay node forwarding delay. If the respective uplink signal does not correspond to a real-time transmission, at 54, aggregate uplink data corresponding to the uplink signal with uplink data from other non-real-time uplink signals received from other terminals. At 55, the method 50 includes, transmitting the aggregate uplink signal. At 56, the method 50 includes receiving an aggregate downlink signal (i.e., a response signal) from the base station. At 57, the method 50 includes extracting downlink data from the aggregate downlink signal, and, at 58, transmitting downlink signals to the corresponding terminals incorporating respective downlink data corresponding to the uplink data that the terminal transmitted.

In one embodiment, the aggregating includes decoding the uplink signals from the terminals to obtain the uplink data, storing the uplink data, and encoding an aggregate uplink signal including the stored uplink data obtained from multiple uplink signals. In one embodiment, the extracting the downlink data from the aggregate downlink signal includes decoding the aggregate downlink signal to obtain the downlink data and storing the downlink data. In one embodiment, the transmitting downlink signals to the corresponding terminals includes encoding the downlink signals to include respective portions of the downlink data decoded from the aggregate downlink signal and corresponding to respective ones of the uplink signals, and transmitting the downlink signals to the terminals.

In reference to FIG. 6, logical flow of a method 60 for aggregation of data transfers from terminals to a base station in a wireless telecommunications network includes, at 61, transmitting an uplink signal. The uplink signal includes uplink data. At 62, the method 60 further includes, transmitting an indication regarding whether the uplink signal corresponds to a real-time transmission. The indication is configured for a relay node to determine based on the indication whether the uplink data is to be included in an aggregate uplink signal to be transmitted to a base station, the aggregate uplink signal including the uplink data and additional uplink data obtained from additional uplink signals transmitted by devices other than the terminal. At 63, the method 60 includes, receiving from the relay node a downlink signal corresponding to the uplink signal.

Figure 7:
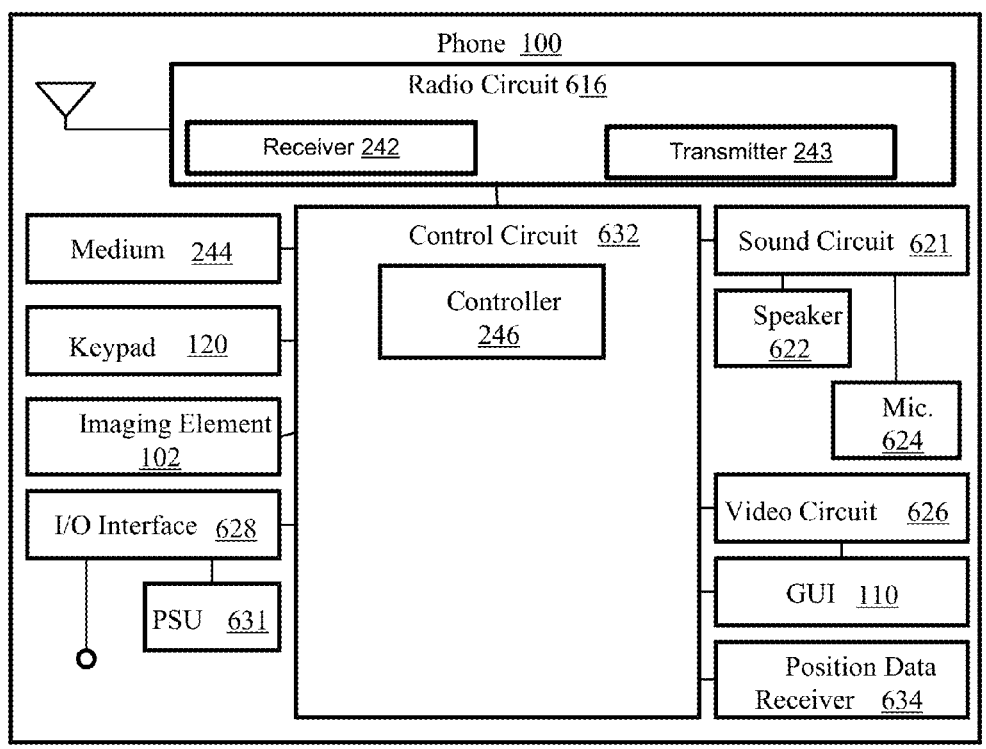
FIG. 7 illustrates a detailed block diagram of an exemplary terminal.

FIG. 7 illustrates a detailed block diagram of an exemplary terminal, which in the illustrated embodiment is represented by the mobile phone 100. The phone 100 includes a control circuit 632 that is responsible for overall operation of the phone 100. For this purpose, the control circuit 632 includes the terminal controller 246 that executes various applications, including applications related to or that form part of the phone 100 functioning as a terminal.

In one embodiment, functionality of the phone 100 acting as the terminal described above in reference to FIGS. 1-6 are embodied in the form of executable logic (e.g., lines of code, software, or a program) that is stored in the non-transitory computer readable medium 244 (e.g., a memory, a hard drive, etc.) of the phone 100 and is executed by the control circuit 632. The described operations may be thought of as a method that is carried out by the phone 100. Variations to the illustrated and described techniques are possible and, therefore, the disclosed embodiments should not be considered the only manner of carrying out phone 100 functions.

The phone 100 further includes the GUI 110, which may be coupled to the control circuit 632 by a video circuit 626 that converts video data to a video signal used to drive the GUI 110. The video circuit 626 may include any appropriate buffers, decoders, video data processors and so forth.

The phone 100 further includes communications circuitry that enables the phone 100 to establish communication connections such as a telephone call. In the exemplary embodiment, the communications circuitry includes a radio circuit 616. The radio circuit 616 includes one or more radio frequency transceivers including the receiver 242, the transmitter 243 and an antenna assembly (or assemblies). Since the phone 100 is capable of communicating using more than one standard, the radio circuit 616 including the receiver 242 and the transmitter 243 represents each radio transceiver and antenna needed for the various supported connection types.

The radio circuit 616 including the receiver 242 and the transmitter 243 further represents any radio transceivers and antennas used for local wireless communications directly with an electronic device, such as over a Bluetooth interface.

The transmitter 243 transmits uplink signals that include uplink data. The receiver 242 receives from the relay node a downlink signal corresponding to the transmitted uplink signal. The transmitter 243 (or another transmitter in the phone 100) also transmits an indication, as described above, regarding whether the uplink signal corresponds to a real-time transmission. In one embodiment, the indication is included in the uplink signal. In another embodiment, the indication is included in an indication signal separate from the uplink signal and transmitted via a physical channel (e.g., Physical Random Access Channel (PRACH), Physical Uplink Shared Channel (PUSCH), Physical Uplink Control Channel (PUCCH), etc.)

As indicated, the phone 100 includes the primary control circuit 632 that is configured to carry out overall control of the functions and operations of the phone 100. The terminal controller 246 of the control circuit 632 may be a central processing unit (CPU), microcontroller or microprocessor. The terminal controller 246 executes code stored in a memory (not shown) within the control circuit 632 and/or in a separate memory, such as the machine-readable storage medium 244, in order to carry out operation of the phone 100. The machine-readable storage medium 244 may be, for example, one or more of a buffer, a flash memory, a hard drive, a removable media, a volatile memory, a non-volatile memory, a random access memory (RAM), or other suitable device. In a typical arrangement, the machine-readable storage medium 244 includes a non-volatile memory for long term data storage and a volatile memory that functions as system memory for the control circuit 632. The machine-readable storage medium 244 may exchange data with the control circuit 632 over a data bus. Accompanying control lines and an address bus between the machine-readable storage medium 244 and the control circuit 632 also may be present. The machine-readable storage medium 244 is considered a non-transitory computer readable medium. In one embodiment, data regarding the indication is stored in the machine-readable storage medium 244.

The phone 100 may further include a sound circuit 621 for processing audio signals. Coupled to the sound circuit 621 are a speaker 622 and a microphone 624 that enable a user to listen and speak via the phone 100, and hear sounds generated in connection with other functions of the device 100. The sound circuit 621 may include any appropriate buffers, encoders, decoders, amplifiers and so forth.

The phone 100 may further include a keypad 120 that provides for a variety of user input operations as described above in reference to FIG. 1. The phone 100 may further include one or more input/output (I/O) interface(s) 628. The I/O interface(s) 628 may be in the form of typical electronic device I/O interfaces and may include one or more electrical connectors for operatively connecting the phone 100 to another device (e.g., a computer) or an accessory (e.g., a personal handsfree (PHF) device) via a cable. Further, operating power may be received over the I/O interface(s) 628 and power to charge a battery of a power supply unit (PSU) 631 within the phone 100 may be received over the I/O interface(s) 628. The PSU 631 may supply power to operate the phone 100 in the absence of an external power source.

The phone 100 also may include various other components. For instance, the imaging element 102 may be present for taking digital pictures and/or movies. Image and/or video files corresponding to the pictures and/or movies may be stored in the machine-readable storage medium 244. As another example, a position data receiver 634, such as a global positioning system (GPS) receiver, may be present to assist in determining the location of the phone 100.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A relay node for aggregating data transfers in a wireless telecommunications network, the relay node comprising:
  a receiver configured to receive uplink signals from multiple terminals, each uplink signal including respective uplink data;
  a decoder operatively connected to the receiver and configured to decode the uplink signals to obtain the uplink data;
  a machine-readable storage medium operatively connected to the decoder and configured to store the uplink data;
  an encoder operatively connected to the machine-readable medium and configured to encode an aggregate uplink signal including the uplink data obtained from the uplink signals;
  a transmitter configured to transmit an uplink transmission of the aggregate uplink signal to a base station; and
  an aggregation logic configured to determine whether the uplink data is to be included in the aggregate uplink signal to be transmitted to the base station or whether the uplink signals are to be transmitted to the base station.

2. The relay node of claim 1, wherein, where an indication indicates that an uplink signal is a real-time transmission, the aggregation logic is configured to instruct the transmitter to transmit the uplink signal to the base station.

3. The relay node of claim 1, wherein, where an indication indicates that an uplink signal is not a real-time transmission, the aggregation logic is configured to instruct the encoder to encode the aggregate uplink signal including the uplink data obtained from the uplink signal.

4. The relay node of claim 1, wherein:
  the receiver or another receiver in the relay node is configured to receive an aggregate downlink signal from the base station, the aggregate downlink signal including downlink data corresponding to respective ones of the uplink signals;
  the decoder or another decoder in the relay node is configured to decode the aggregate downlink signal to obtain the downlink data;
  the machine-readable storage medium or another machine-readable storage medium in the relay node is configured to store the downlink data;
  the encoder or another encoder in the relay node is configured to encode multiple downlink signals, the multiple downlink signals each including respective downlink data corresponding to portions of the downlink data decoded from the aggregate downlink signal and corresponding to respective ones of the uplink signals; and
  the transmitter or another transmitter in the relay node is configured to transmit the multiple downlink signals to the multiple terminals.

5. A method for aggregation of data transfers in a wireless telecommunications network, the method comprising:
- receiving uplink transmissions of uplink signals from multiple terminals, each uplink signal including respective uplink data;
- decoding the uplink signals to obtain respective uplink data and storing the uplink data;
- encoding an aggregate uplink signal including the uplink data obtained from the uplink signals;
- transmitting the aggregate uplink signal to a base station; and
- determining whether the uplink data is to be included in the aggregate uplink signal to be transmitted to the base station or whether the uplink signals are to be transmitted to the base station.

6. The method of claim 5, comprising:
- receiving from the multiple terminals indications regarding whether respective uplink signals correspond to real-time transmissions; and
- based on the indications regarding whether the respective uplink signals correspond to real-time transmissions determine whether the uplink data is to be included in the aggregate uplink signal to be transmitted to the base station or whether the uplink signals are to be transmitted to the base station.

7. The method of claim 6, wherein the indications indicate whether a respective terminal is a machine-type communication device.

8. The method of claim 5, wherein, where an indication indicates that the respective uplink signal is a real-time transmission, the method includes:
- transmitting the respective uplink signal to the base station without including uplink data corresponding to the respective uplink signal in the aggregate uplink signal.

9. The method of claim 5, wherein, where an indication indicates that the respective uplink signal is not a real-time transmission, the transmitting the aggregate uplink signal to the base station includes:
- transmitting the aggregate uplink signal including data corresponding to the respective uplink signal in the aggregate uplink signal.

10. The method of claim 5, the method comprising:
- receiving an aggregate downlink signal from the base station, the aggregate downlink signal including downlink data including data corresponding to a respective one of the uplink signals;
- decoding the aggregate downlink signal to obtain the downlink data and storing the downlink data;
- encoding multiple downlink signals, the multiple downlink signals each including respective downlink data corresponding to portions of the downlink data decoded from the aggregate downlink signal and corresponding to respective ones of the uplink signals; and
- transmitting the multiple downlink signals to the multiple terminals.

* * * * *